Nov. 22, 1960

J. S. LUCE ET AL 2,961,558

CO-AXIAL DISCHARGES

Filed Jan. 29, 1959

3 Sheets-Sheet 1

INVENTORS
John S. Luce &
Lloyd P. Smith

BY

ATTORNEY

Nov. 22, 1960     J. S. LUCE ET AL     2,961,558
CO-AXIAL DISCHARGES

Filed Jan. 29, 1959     3 Sheets-Sheet 2

INVENTORS
John S. Luce &
Lloyd P. Smith
BY
ATTORNEY

United States Patent Office 2,961,558
Patented Nov. 22, 1960

2,961,558
CO-AXIAL DISCHARGES

John S. Luce, Oak Ridge, Tenn., and Lloyd P. Smith, North Andover, Mass., assignors to the United States of America as represented by the United States Atomic Energy Commission Filed Jan. 29, 1959, Ser. No. 790,031

15 Claims. (Cl. 313—63)

This invention relates to a method of and apparatus for producing co-axial arc discharges, and more especially to means for producing and containing an energetic plasma.

It is an axion of physics that a charged particle injected into any static magnetic field configuration will not be trapped but will eventually come back out unless its orbit is changed while it is within the field. As a result of this principle, ions injected from an ion source return, strike the source and are lost. If it is desired to heat a gas inside an arc-discharge chamber by introducing energetic particles, such loss would prevent the transfer of energy to the gas in the chamber. Also, some of the injected particles are lost by collisions with walls and solid electrodes.

With a knowledge of the fact that injected energetic particles will be lost by returning to the source of such injection and/or by collisions with walls and solid electrodes, it is a primary object of this invention to provide co-axial arc discharges which will provide a means of heating a body of low-pressure deuterium or tritium gas to temperatures high enough to produce useful nuclear collisions by accelerating deuterium or tritium ions in the region between the arcs so that they attain sufficiently high energies to be useful, and thence communicate this energy to other deuterons or tritons in an efficient manner, or to accumulate enough ions in the region so that trapping would result from ion-ion collisions.

It is another object of this invention to provide co-axial arc discharges in a magnetic field and with a potential gradient established between the discharges to accelerate ions and electrons across the field, to thereby effect trapping of a portion of said ions.

It is still another object of this invention to provide a device for producing co-axial arc discharges in which all physical electrodes in the operating volume are replaced with arc discharges which act as electrodes.

Figure 1:
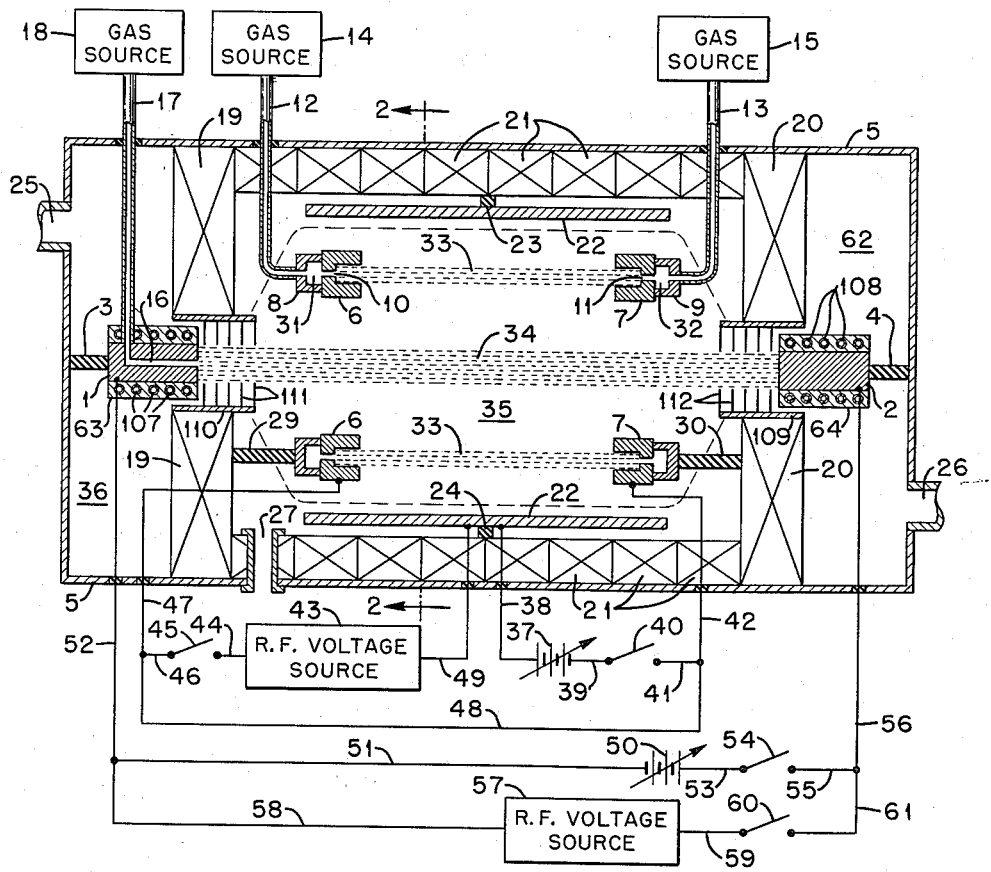
Figure 2:
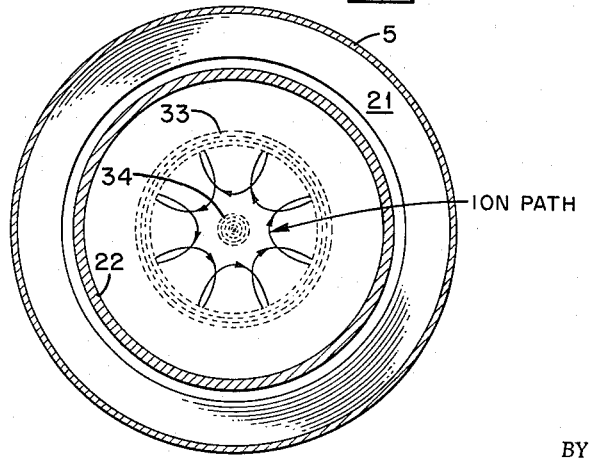
Figure 5:
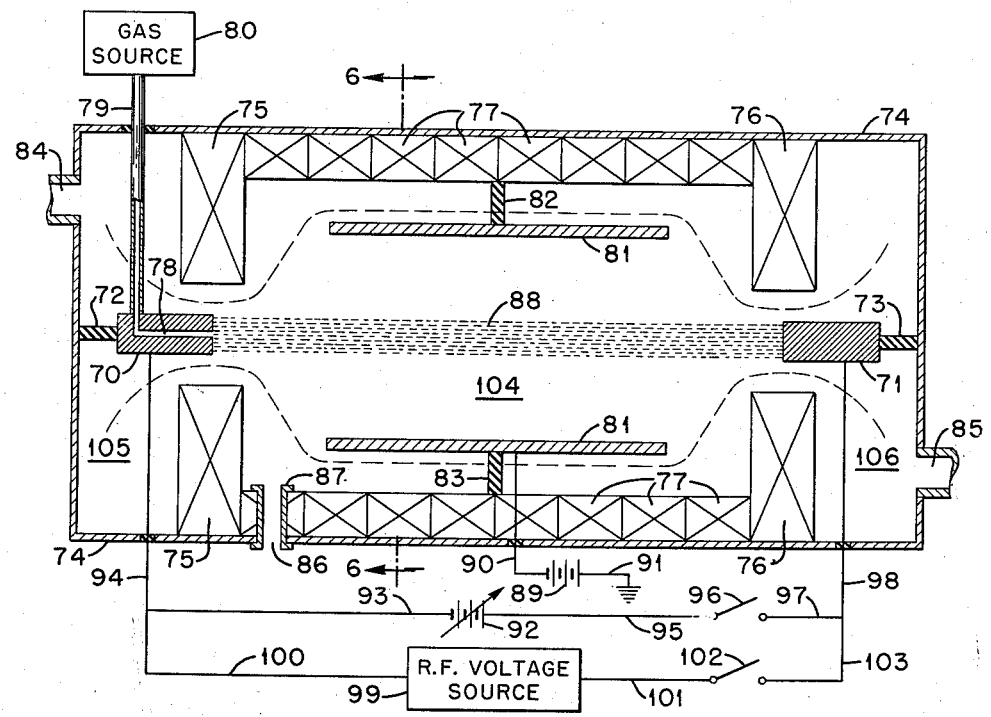
Figure 3:
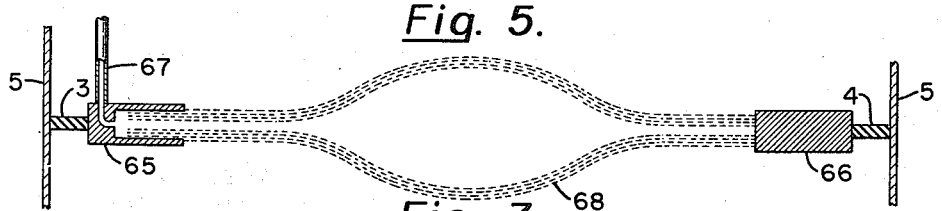
Figure 4:
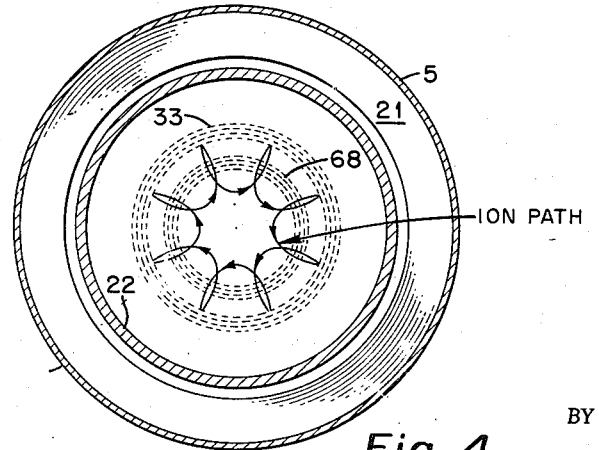
Figure 6:
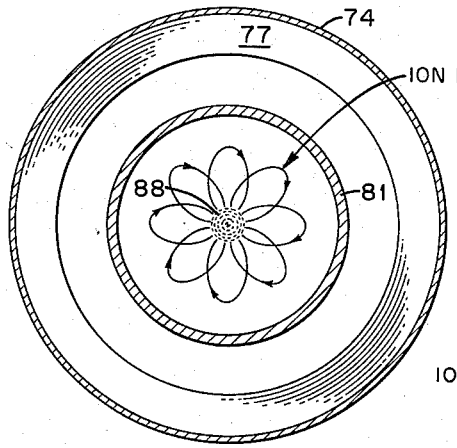
Figure 7:
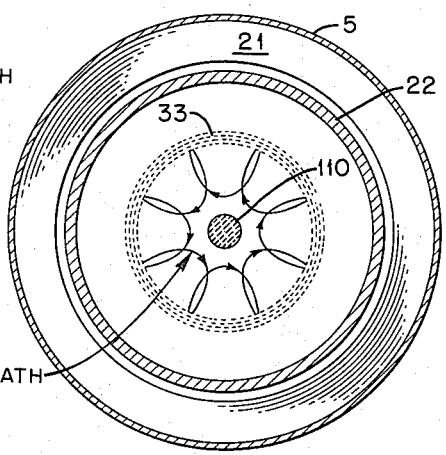
Figure 8:
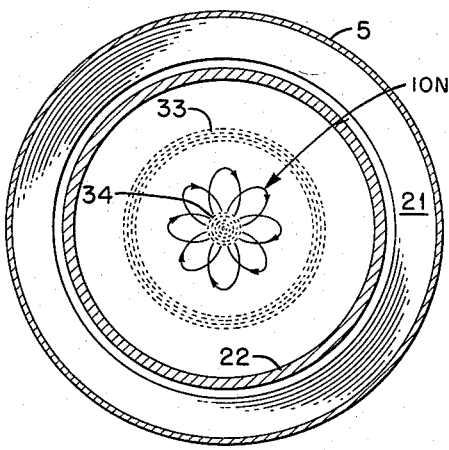
Figure 9:
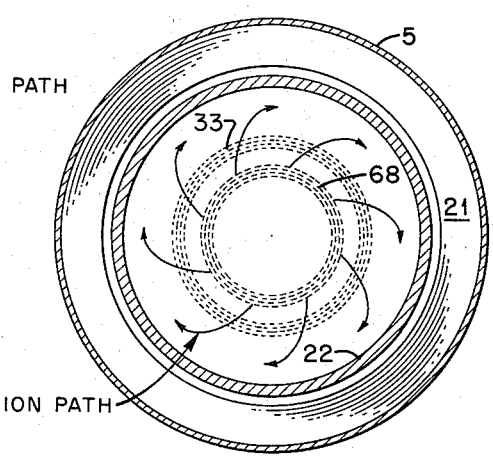

These and other objects and advantages will become apparent from a consideration of the following detailed specification and the accompanying drawings, wherein:

Fig. 1 shows a cross-sectional view of co-axial arc discharges in a mirror type machine, Fig. 2 shows a sectional view on the line 2—2 of Fig. 1, with the outer arc being positive with respect to the central arc, Fig. 3 shows a sectional view of a hollow central arc which can be substituted for the central arc of Fig. 1, Fig. 4 shows a sectional view on line 2—2 of Fig. 1 when the arc of Fig. 3 is substituted for the central arc of Fig. 1, and with the same polarity across the arcs as in Fig. 2, Fig. 5 shows a cross-sectional view of a device in which a solid cylinder is used to enclose the central arc discharge, Fig. 6 shows a cross-sectional view on the line 6—6 of Fig. 5, Fig. 7 shows a cross-sectional view on the line 2—2 of Fig. 1 where a solid electrode is substituted for the central arc in Fig. 1, Fig. 8 shows a cross-sectional view on the line 2—2 of Fig. 1, with the inner arc being positive with respect to the outer arc, and Fig. 9 is a cross-sectional view on the line 2—2 of Fig. 1 when the arc of Fig. 3 is substituted for the central arc of Fig. 1, with the inner arc being positive with respect to the outer arc.

The objects stated above have been achieved in the present invention by providing a strong, axial magnetic field and an axially aligned outer cylindrical deuterium or tritium arc and an inner cylindrical or solid deuterium or tritium arc so operated that the potential of the two arcs are opposite in sign. When the arcs are maintained at a high potential difference, electrons will diffuse to the more positive arc from the negative arc and positive ions will diffuse from the more positive are to the negative arc. Due to the very small electron orbits in the magnetic field, they must make many collisions before they arrive at the more positive arc and consequently the resistance to flow of electrons will be great. An ion leaving the more positive arc will have substantially zero energy. When it attains its maximum energy during acceleration across the magnetic field, it will return to the more positive arc unless it makes a collision in its trajectory. If the ion does not make a collision in its trajectory, then when it returns to the more positive arc where it originated, it will again have zero energy and can start a new trajectory; thus no energy is lost from the power supply until a collision with another ion or atom takes place. If a collision does take place, the ion then travels on a trajectory, on the average, that would allow it to be accelerated toward the negative arc or be trapped in the region between the arcs. When and if the ion reaches the negative arc it does not lose energy except by making a useful collision, so that the energy of the ion thus accelerated is not lost by conversion to useless heat energy at a solid electrode.

The use of a strong mirror magnetic field and the co-axial arcs permits the plasma to be contained, while the ions are accelerated to high energies.

Either of the concentric arcs may be made more positive than the other and only the more positive arc need be a gas arc to provide a source of positive ions for the device. In addition, a solid electrode may be substituted for either the inner or outer arc with the remaining arc held at a positive potential with respect to the solid electrode. In all possible configurations, the operation is the same; that is, positive ions will diffuse across the magnetic field from the positive gas arc to a negative solid electrode or arc in the same manner as indicated above. The arc discharges employed in the various modifications are considered to be electrodes since they perform the same function as electrodes with the exception that no energy is lost from the system by ions striking the discharges.

Referring now to Fig. 1 which illustrates one embodiment in which the principles of this invention may be carried out, a centrally bored cathode 1 is mounted to the chamber wall 5 by an insulator 3, for example. An anode electrode 2 is mounted to the chamber wall 5 by an insulator 4, for example. Deuterium or tritium gas is fed from a source 18, through tube 17 and hole 16 in cathode 1 to the face thereof. In some cases, it may be desired to feed gas to the face of the anode in a manner similar to that for cathode 1. A pair of magnetic mirror coils 19 and 20 are disposed adjacent to the cathode and anode respectively as shown, and a plurality of magnetic solenoid coils 21 are disposed in end-to-end relation between the mirror coils 19 and 20. The mirror coils and solenoid coils provide a containing magnetic field as illustrated by the dashed lines within the container 5 as shown. The chambers 36 and 62 are connected to vacuum pumps through the openings 25 and 26, respectively. The inner chamber 35 is connected to a vacuum pump by the opening 27. A variable source of D.C. potential, such as a multi-cell, variable-tap battery 50, is connected at one side to cathode 1 by a lead 51 and lead 52, and is connected at its other side to anode 2 by a lead 53, switch 54, lead 55, and lead 56. A source of R.F. voltage 57, such as used in a conventional welding system, is connected at one side to cathode 1 by a lead 58, and lead 52, and is connected at its other side to anode 2 by lead 59, switch 60, lead 61, and lead 56. The energetic arc discharge 34 may be initiated and sustained between the cathode 1 and anode 2 in a manner similar to that disclosed, for Fig. 1 of the application of Persa R. Bell and John S. Luce, Serial No. 750,834, filed July 24, 1958 now Patent No. 2,920,235, issued January 5, 1960.

The arc discharge 33 may be a reflux-type discharge operating on the Phillips ionization gauge principle. It may also be a D.C. arc or a discharge similar to the discharge 34, or other suitable discharge if desired. The apparatus for providing the reflux discharge 33 will now be described. A cylindrical cathode 6 is connected through an opening 10 to an area 31 of the gas chamber 8. The chamber 8 is mounted by an insulator 29 to the coil 19 housing. Deuterium or tritium gas is fed from a source 14, and through a tube 12 to the interior of annular chamber 8. A cylindrical cathode 7 is connected through an opening 11 to an area 32 of the gas chamber 9. The chamber 9 is mounted by an insulator 30 to the housing around coil 20. Deuterium or tritium gas is fed from a source 15, and through tube 13 to the interior of annular chamber 9. A cylindrical anode 22 is mounted by insulators 23 and 24 to the housing on some of the coils 21. The anode 22 may be in the shape of a simple ring, if desired. A source of variable D.C. potential 37 such as a variable-tap, multi-cell battery or D.C. generator, is connected at one side to the anode 22 by lead 38, and at its other side to cathode 6 by lead 39, switch 40, lead 41, lead 48, and lead 47, and to cathode 7 by lead 39, switch 40, lead 41, and lead 42. An R.F. voltage source 43, such as used in a conventional welding system, is connected at one side to anode 22 by a lead 49, and is connected at its other side to cathode 6 by a lead 44, switch 45, lead 46, and lead 47, and to cathode 7 by lead 44, switch 45, lead 46, lead 48, and lead 42. The reflux-type discharge 33 may be initiated and sustained in a manner similar to that disclosed for Fig. 3 of the application of John S. Luce, Serial No. 748,771, filed July 15, 1958, now Patent No. 2,927,232, issued March 1, 1960.

The electrodes 1 and 2 may be cooled by any suitable means such as cooling tubes 107 and 108 mounted in jackets 63 and 64, respectively, and disposed around the electrodes. Also, annular baffles 111 and 112 are mounted on members 110 and 109, respectively, and are provided adjacent to each of the cathode 1 and anode 2 electrodes, respectively, in a manner similar to that shown in the aforementioned application. In addition, annular baffles and cooling coils may be provided for the electrodes 6 and 7 for the outer arc 33.

In one operation of the apparatus of Fig. 1 at startup, gas is fed from source 18, through tube 17, and through hole 16 in cathode 1 to the cathode face. Gas is also fed from source 14, and through tube 12 to interior of chamber 8, and then through opening 10 to the face of cathode 6, and gas is fed from source 15, and through tube 13 to the interior of chamber 9, and then through opening 11 to the face of cathode 7. When the pressure at the faces of all the cathodes reaches a value of $3 \times 10^{-3}$ mm. Hg, an R.F. voltage source 57 and a D.C. source 50 are connected across the electrodes 1, 2, and an R.F. voltage source 43 and a D.C. source 37 are connected across the electrodes 6, 7 and 22. After the arcs 33 and 34 are initiated, the R.F. voltage sources are disconnected. The pressure in chamber 35 is then gradually reduced until it reaches a value of approximately $5 \times 10^{-5}$ mm. Hg, or lower. The pressures in outer chambers 36 and 62 are maintained at a value of approximately $3 \times 10^{-4}$ mm. Hg, or lower. The arcs may be initiated at startup with a pressure lower than $3 \times 10^{-3}$ mm. Hg provided the R.F. voltage sources and the operating potentials are correspondingly increased. When a D.C. gas arc is used for the outer arc, it may be initiated and sustained in a manner similar to arc 34. Under these conditions the anode 22 would not be required and the cathode 7 would then be used as an anode and the potentials across the electrodes would then be connected in the same manner as for electrodes 1 and 2 for the inner arc.

There are several other conventional methods for helping to initiate an arc discharge between the electrodes other than those specified above, such as applying a very high starting potential between the electrodes, heating the electrodes until they are completely outgassed and then applying a high starting potential between the electrodes, or by providing an auxiliary electrode adjacent to the cathode and momentarily touching the cathode with said auxiliary electrode while at the same time applying a voltage between the cathode and auxiliary electrode until an arc is struck between them and then separating said electrodes while applying an arc potential between the cathode and anode, and then removing the auxiliary electrode.

During all stages of operation of the apparatus of Fig. 1, a magnetic field strength of a selected value, for example 3000 to 6000 gauss, is maintained by the coils 21. The field strengths of the mirror coils 19 and 20 are set at a value higher than that produced by solenoid coils 21 so as to provide the magnetic mirror regions at each end of the device.

In the device of Fig. 1, the outer arc 33 may be positive with respect to the inner arc which may be negative. When the arcs are maintained at a high potential difference, 20–50 kv., for example, electrons will tend to diffuse from the inner arc to the outer arc and ions from the outer arc to the inner arc as discussed above. If the charged particle does not have a collision in its trajectory when it leaves the outer arc, it returns to the outer arc and a new trajectory will begin, as shown in Fig. 2. When ions do suffer a collision, they may see a higher electric field and be accelerated to higher energy and as they make more collisions, they will eventually reach the inner arc. Thus a strong plasma is built up that is essentially a concentric rotating ring of ions surrounding the inner arc, and circulating currents are set up in this ring.

If desired, the polarity of the arcs of Fig. 1 may be reversed so that the outer arc 33 may be negative with respect to the inner arc which then may be positive. In this case the electrons will tend to diffuse from the outer arc to the inner arc, and the ions from the inner arc to the outer arc. Fig. 8 shows a cross-sectional view of Fig. 1 and the ion paths when the polarity of the arcs is thus reversed. In both cases, the negative arc need not be a gas arc but may be a conventional D.C. arc.

The use of co-axial arc discharges for confining an ionized plasma between said discharges has the advantage of preventing impurities from the walls of the device from entering the plasma area because of the arc barrier set up by the cylindrical outer arc.

The arc discharge 34 of Fig. 1 need not be a solid arc but may be hollow. Fig. 3 shows the electrode structure for producing a hollow inner arc that can be substituted for the inner arc of Fig. 1. This hollow arc may be initiated and sustained in a manner similar to that disclosed for Fig. 1 of the aforementioned Luce application. The arc 68 of Fig. 3 is initiated between a cathode 65 and an anode 66. Gas is fed through a tube 67 to the interior of the cathode which is a hollow elongated electrode. The rate of gas feed to the cathode is regulated so that a sheath forms within the cathode where substantially complete space charge neutralization and ionization of the gas takes place before it leaves the cathode. In some cases, it may be desirable to feed gas to the face of the anode 66 by means not shown. When the arc 68 of Fig. 3 is substituted for the arc 34 of Fig. 1, ions will be accelerated at high energy from the outer positive arc 33 and will enter a field-free (electrostatic) region within the innermost negative arc and retain their high energy, as clearly shown in the cross-sectional view of Fig. 4 which shows the concentric hollow arcs and the ion paths. In this arrangement, a plasma of energetic ions will form regardless of where the anode and cathode sheaths form. Unlike other cases, the ions are accelerated to full energy independently of the pressure.

If desired, the polarity of the arcs as shown in Fig. 4 may be reversed so that the arc 33 is negative with respect to the inner arc 68 which is positive. Fig. 9 shows a cross-sectional view of the arcs and the ion paths with such a reverse polarity. The ions will pass through the outer arc 33 into a field-free (electrostatic) region surrounding the outer arc. It should be noted that in this case, the ions also are accelerated from the more positive arc. In addition, the more positive arc, whether it be the center or outer arc, should be a gas fed arc, and the other negative arc may then either be a gas fed arc or a conventional D.C. arc.

If desired, the outer arc 33 of Fig. 1 may be replaced with a cylindrical member. Fig. 5 shows such an arrangement. In Fig. 5 the said cylindrical member is held at a negative potential while the central arc is maintained at a positive potential with respect to said member. Fig. 6 shows a cross-sectional view of Fig. 5 with such polarity connections, and the corresponding ion paths. The paths of the electrons and ions are reversed to what they are in the device of Fig. 1. Otherwise, the operation of the device is the same as for Fig. 1. Since the device of Fig. 5 employs the use of a solid electrode, the energetic ions are lost when they finally strike the outer cylinder. However, it does operate in a similar manner since there is a potential gradient between the arc and the concentric cylinder surrounding the arc.

In Fig. 5, a cathode 70 is mounted by an sulator 72 to be container wall 74, and an anode 71 is mounted by an insulator 73 to the wall 74. Magnetic mirror coils 75 and 76 are disposed adjacent to the cathode 70 and anode 71, respectively. Solenoid coils 77 are disposed in end-to-end relation between the mirror coils 75 and 76. The mirror coils and solenoid coils provide the containing magnetic field for the device as shown by the dashed lines within the container. A hollow cylindrical member 81 is mounted by insulators 82 and 83 to the housing on some of the coils 77. A simple ring may be used instead of the cylindrical member 81, if desired. Cooling coils for the electrodes 70 and 71 and baffles mounted adjacent the electrodes 70 and 71 may be provided, if desired, in a manner similar to that set forth for Fig. 1 above. The chamber 104 is evacuated by a vacuum pump connected to member 87 and through opening 86. The chambers 105 and 106 are evacuated by vacuum pumps connected to openings 84 and 85, respectively, in the outside wall 74. A source of gas 80 is connected by tube 79 and bore 78 in cathode 70 to the face of said cathode. A source of D.C. potential, such as a variable-tap, multi-cell battery 92 or D.C. generator, is connected at one side to cathode 70 by lead 93, and lead 94, and at its other side to anode 71 by lead 95, switch 96, lead 97, and lead 98. A source of R.F. voltage 99, such as used in a conventional welding system, is connected at one side to cathode 70 by lead 100, and lead 94, and at its other side to anode 71 by lead 101, switch 102, lead 103, and lead 98. The cylindrical member 81 is connected to one side of battery 89 by a lead 90, and the other side of battery 89 is grounded. The arc discharge 88 between cathode 70 and anode 71 may be initiated and sustained the same as the discharge 34 of Fig. 1. The arc discharge 68 of Fig. 3 may be substituted for the discharge 88 of Fig. 5 if desired.

If desired, a solid central electrode 110 may be substituted for the central arc 34 of Fig. 1, and the outer arc discharge 33 would then be held at a positive potential with respect to the central electrode. In such an arrangement the positive ions from the outer arc 33 would be accelerated toward the central electrode 110. Fig. 7 shows a cross-sectional view of such an arrangement with the corresponding ion paths.

The arc discharges set forth in the instant disclosure are also useful as a means for providing a source of energetic ions, and also as dissociation mechanisms for injected energetic molecular ions in a manner set forth in the application of John S. Luce, Serial No. 728,754, filed April 15, 1958.

This invention has been described by way of illustration rather than limitation and it should be apparent that the invention is equally applicable in fields other than those described.

What is claimed is:

1. A method for forming an energetic ion plasma comprising the steps of establishing a magnetic field oriented along the axis of an evacuated container, establishing magnetic mirror fields at each end of said container and oriented along said axis, initiating and sustaining a gas fed arc discharge coaxial with said axis, and establishing and maintaining a radial potential gradient normal to the surface of said arc discharge to accelerate ions therefrom and attract electrons thereto.

2. A method for forming an energetic ion plasma comprising the steps of establishing a magnetic field oriented along the axis of an evacuated container, establishing magnetic mirror fields at each end of said container and oriented along said axis, intiating and sustaining a first arc discharge coaxial with said axis, initiating and sustaining a second cylindrical arc discharge coaxial with said first discharge and spaced apart therefrom to provide an annular space between said discharges, at least one of said discharges being a gas fed discharge, and establishing and maintaining an electrical potential gradient between said discharges, whereby charged particles including both ions and electrons are accelerated between the discharges thereby building up and trapping a plasma of energetic particles in said annular space.

3. The method set forth in claim 2, wherein the cylindrical arc discharge is a gas fed arc discharge and wherein said electrical potential gradient is established in such direction that ions are accelerated from and electrons are accelerated toward said cylindrical arc discharge.

4. The method set forth in claim 2, wherein said first arc discharge is a gas fed arc discharge and wherein said electrical potential gradient is established in such direction that ions are accelerated from and electrons are accelerated toward said first arc discharge.

5. A device for forming energetic ions comprising a container, means for evacuating said container, means providing a containing magnetic field within said container and oriented along the axis of said container, means providing a magnetic mirror field at each end of said container and oriented along said axis, a first electrode disposed along said axis, a second cylindrical electrode coaxial with said first electrode with an annular space between said electrodes, at least one of said electrodes being a gas fed arc discharge, and means connected between said electrodes for establishing a large potential gradient therebetween, whereby charged particles including both ions and electrons are accelerated into said space between the electrodes, thereby building up and trapping a plasma of energetic particles.

6. The device set forth in claim 5, wherein the axial electrode is the gas fed arc discharge, the cylindrical electrode is a D.C. arc discharge, and the axial electrode is held at a positive potential with respect to the cylindrical electrode.

7. The device set forth in claim 5, wherein the cylindrical electrode is the gas fed arc discharge, the axial electrode is a D.C. arc discharge, and the cylindrical electrode is held at a positive potential with respect to the axial electrode.

8. The device set forth in claim 5, wherein both electrodes are gas fed arc discharges.

9. The device set forth in claim 5, wherein the axial electrode is a hollow gas fed arc discharge, the cylindrical electrode is the gas fed arc discharge, and the axial electrode is held at a positive potential with respect to the cylindrical electrode.

10. The device set forth in claim 5, wherein the axial electrode is a hollow gas fed arc discharge, the cylindrical electrode is the gas fed arc discharge, and the cylindrical electrode is held at a positive potential with respect to the axial electrode.

11. The device set forth in claim 5, wherein the gas fed arc discharge electrode is the axial electrode, the cylindrical electrode is a solid electrode, and the axial electrode is held at a positive potential with respect to the solid cylindrical electrode.

12. The device set forth in claim 5, wherein the gas fed arc discharge electrode is the cylindrical electrode, the axial electrode is a solid electrode, and the cylindrical electrode is held at a positive potential with respect to the solid axial electrode.

13. The device set forth in claim 5, wherein the gas fed to the arc discharge electrode is a mixture of deuterium and tritium.

14. The device set forth in claim 5, wherein the gas fed to the arc discharge electrode is tritium.

15. The device set forth in claim 5, wherein the axial electrode is the gas fed arc discharge and is hollow, the cylindrical electrode is a D.C. arc discharge, and the axial electrode is held at a positive potential with respect to the cylindrical electrode.

References Cited in the file of this patent

Atomic Industry Reporter, News and Analysis, Official Text Section, 1958, filing No. TK 9001 A7, issue of January 29, 1958, pages 54:5–54:11.

Project Sherwood, Bishop, Addison-Wesley Press, Reading, Mass., 1958, pages 67–69.